(12) United States Patent
Guo

(10) Patent No.: US 10,132,632 B2
(45) Date of Patent: Nov. 20, 2018

(54) HEMISPHERICAL RESONANCE MICROMECHANICAL GYROSCOPE AND PROCESSING METHOD THEREOF

(71) Applicant: SUZHOU WENZHIXIN MICRO SYSTEM TECHNOLOGY CO., LTD, Jiangsu (CN)

(72) Inventor: Shuwen Guo, Jiangsu (CN)

(73) Assignee: SUZHOU WENZHIXIN MICRO SYSTEM TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 15/814,399

(22) Filed: Nov. 16, 2017

(65) Prior Publication Data

US 2018/0164098 A1    Jun. 14, 2018

Related U.S. Application Data

(63) Continuation-in-part of application No. 14/408,177, filed as application No. PCT/CN2012/080825 on Aug. 31, 2012.

(30) Foreign Application Priority Data

Jun. 15, 2012  (CN) .......................... 2012 1 0182174
Jul. 15, 2012  (CN) .......................... 2012 1 0231285

(51) Int. Cl.
*G01C 19/56*   (2012.01)
*G01C 25/00*   (2006.01)
(Continued)

(52) U.S. Cl.
CPC ..... *G01C 19/5691* (2013.01); *G01C 19/5719* (2013.01); *G01C 25/005* (2013.01); *G01P 15/02* (2013.01)

(58) Field of Classification Search
CPC .................................................. G01C 19/5691
(Continued)

(56) References Cited

U.S. PATENT DOCUMENTS 8,109,145 B2   2/2012   Stewart
8,806,939 B2   8/2014   Painter
(Continued)

FOREIGN PATENT DOCUMENTS

CN    1207496    2/1999
CN    101553734    10/2009
(Continued)

OTHER PUBLICATIONS

Wu et al., "Researching Development of All-Solidstate Micromahcined Gyroscope,"Chinese Journal of Electron Devices, Oct. 2008, pp. 1505-1509.
(Continued)

*Primary Examiner* — Matthew G Marini
*Assistant Examiner* — Ruben Parco, Jr.
(74) *Attorney, Agent, or Firm* — JCIPRNET

(57) ABSTRACT

The present invention relates to a micromachined hemispherical resonance gyroscope, which includes a resonant layer, wherein the resonant layer comprises a hemispherical shell whose top point of the hemispherical shell is its anchor point; several silicon hemispherical electrodes are arranged around the hemispherical shell, the silicon hemispherical electrodes include driving electrodes, equilibrium electrodes, shielded electrodes and signal detection electrodes or quadrature correction electrodes, the hemispherical shell and the several silicon spherical electrodes which surround the hemispherical shell constitute several capacitors. The hemispherical resonance micromechanical gyroscope utilizes a processing method on the basis of silicon micromachining, which leads to small size and low production cost, as well
(Continued)

as batch production capacity, meanwhile its sensitivity is independent of amplitude and its driving voltage could be very low, as a result its output noise could be significantly reduced, and its accuracy is better than the gyroscope products in the prior art.

14 Claims, 12 Drawing Sheets

(51) Int. Cl.
　　*G01C 19/5691*　　(2012.01)
　　*G01P 15/02*　　(2013.01)
　　*G01C 19/5719*　　(2012.01)

(58) Field of Classification Search
　　USPC .................................................. 73/504.13
　　See application file for complete search history.

(56) References Cited

U.S. PATENT DOCUMENTS

| | | |
|---|---|---|
| 2009/0031831 A1 | 2/2009 | Stewart |
| 2010/0083758 A1 | 4/2010 | Vandebeuque et al. |
| 2011/0290021 A1 | 12/2011 | Horning et al. |
| 2012/0144917 A1 | 6/2012 | Painter |
| 2013/0104653 A1* | 5/2013 | Bernstein ........... G01C 19/5691 73/504.13 |

FOREIGN PATENT DOCUMENTS

| | | |
|---|---|---|
| CN | 101568801 | 10/2009 |
| CN | 101802552 | 8/2010 |
| CN | 101968359 | 2/2011 |
| CN | 101968360 | 2/2011 |
| CN | 102057250 | 5/2011 |
| CN | 102506841 | 6/2012 |
| CN | 105466405 A * | 4/2016 |
| EP | 2390624 | 7/2013 |

OTHER PUBLICATIONS

Ji et al., "Study on resonator's characteristics of micro-HRG," Transducer and Microsystem Technologies, Mar. 2006, pp. 44-50.

Zhiqing LV, "Research and Development of hemispherical resonance gyroscope (HRG)," Proceedings of symposium on development and directions of internal technology, Dec. 2003, pp. 103-105.

* cited by examiner

φ    Rotation angle of hemispherical shell
θ    Vibration wave rotation angle
Ω    Inertial angular rate
ω    Angular rate of vibration wave $\theta = K\Phi$
$\omega = K\Omega$ $\vec{F}_{coriolis} = 2m\vec{V} \times \vec{\Omega}$ K    Angular-gain factor F    Coriolis force

HEMISPHERICAL RESONANCE MICROMECHANICAL GYROSCOPE AND PROCESSING METHOD THEREOF

CROSS-REFERENCE TO RELATED APPLICATION

This application is a continuation-in-part application of and claims the priority benefit of a prior U.S. patent application Ser. No. 14/408,177, filed on Oct. 21, 2015. The prior application Ser. No. 14/408,177 is a 371 of international application of PCT application serial no. PCT/CN2012/080825, filed on Aug. 31, 2012, which claims the priority benefit of China application no. 201210231285.0, filed on Jul. 15, 2012, and China application no. 201210182174.5, filed on Jun. 15, 2012. The entirety of each of the above-mentioned patent applications is hereby incorporated by reference herein and made a part of this specification.

BACKGROUND

1. Field of the Invention

The present invention relates to a hemispherical resonance micromechanical gyroscope, as well as the processing method on the basis of silicon micromachining used therein.

2. Description of Related Art

A silicon micromechanical gyroscope has a wide range of application prospects in the field of inertial measurement due to its advantages such as small size, low cost, low power consumption, impact resistance and high reliability. However, accuracy of a MEMS gyroscope product is much lower than a FOG or a laser gyroscope, mainly because the accuracy depends on the size of its amplitude for most of the MEMS resonance gyroscopes, and the noise signal increases along with the increase of the amplitude, which restricts improvement of the SNR. Due to the low accuracy, its application field is greatly restricted.

A traditional hemispherical resonance gyroscope is made of quartz, and its principle is based on cup body vibration theory proposed by Professor Bryan of the university of Cambridge one hundred years ago. The theory indicates that during a hemispherical cup body rotates around the centreline of the cup, its four antinodes vibration pattern will deflect. By detecting the phase changes of the deflection vibration pattern, an angular acceleration signal could be acquired. The hemispherical resonance gyroscope has a very accurate scale factor and a satisfactory random drift and bias stability, and the gain and the scale factor of the gyroscope are independent of its material, which are only the functions of the stress wave oscillation mode on the thin shell. The gyroscope is not sensitive to the external environment (acceleration, vibration, temperature, etc.), and even the temperature compensation is not required by the gyroscope, therefore the hemispherical resonance gyroscope is recognized in the inertial technology field as one of the best gyroscope products with high performance at present, which has an accuracy higher than the FOG or the laser gyroscope, as well as additional advantages such as high resolution, wide measuring range, resistance to overload, anti-radiation, anti-interference, etc.

However, the traditional hemispherical resonance gyroscope is made of fused quartz, which makes it difficult to process and highly cost. Its price is up to several hundred thousands to a million dollars, as a result it can't be widely used. In addition, its size is also too large, and the diameter of the hemispherical resonance gyroscope with minimum size is still up to 20 mm currently. Therefore, the development of a new generation of hemispherical resonance gyroscope with miniature size and low cost naturally becomes the target in inertial technology field.

SUMMARY

It's an object of the present invention to provide a new type of MEMS hemispherical resonance gyroscope on the basis of phase detection principle with high accuracy, small size and low cost, as well as the processing method on the basis of silicon micromachining used therein.

The object of the present invention has been achieved by the following technical means.

A hemispherical resonance micromechanical gyroscope, which comprises a resonant layer comprising a hemispherical shell and several silicon hemispherical electrodes being arranged around the hemispherical shell, the silicon spherical electrodes include driving electrodes, equilibrium electrodes, shielded electrodes and equilibrium electrodes, signal detection electrodes or quadrature correction electrodes, the shielded electrodes separate the driving electrodes and the equilibrium electrodes from the signal detection electrodes, and the shielded electrodes converge at a point and the converging point is anchor point of the hemispherical shell, the mechanical support and electrical connection of the shielded electrodes and the hemispherical shell are accomplished through the anchor point, the hemispherical shell and the several silicon spherical electrodes which surround the hemispherical shell constitute several capacitors, and the hemispherical shell is made of in-situ doped polysilicon, silicon oxide, silicon nitride, or diamond.

In some embodiments, the number of the silicon hemispherical electrodes is 20 or 24, including 4 or 8 shielded electrodes therein, and the shielded electrodes are averagely and symmetrically distributed along the circumferential direction of the hemispherical shell.

In some embodiments, the radius of the hemispherical shell is 600-5000 μm, which is typically 1200-1800 μm; and the thickness of the hemispherical shell is 0.5-10 μm, which is typically 1.5-2.0 μm.

In some embodiments, the operating resonance mode of the hemispherical shell, i.e. the minimum resonance mode is four antinodes mode, and the resonant frequency is 2.0-15.0 kHz, which is typically 13-20 kHz.

In some embodiments, one side of the resonant layer which is close to the hemispherical shell is bound with a first capping layer, and the other side of the resonant layer which is close to the silicon hemispherical electrodes is bound with a second capping layer; wherein the first capping layer is a glass plate or a silicon plate with a silicon oxide layer, and the second capping layer is made of glass material containing through-holes or silicon material containing through-holes, the glass material containing through-holes or silicon material containing through-holes guides the silicon hemispherical electrodes to the surface of the hemispherical resonance micromechanical gyroscope.

A processing method for the hemispherical resonance micromechanical gyroscope mentioned above, which comprises following steps:

(1) isotropic etching a hemispherical pit on one side of a silicon wafer;

(2) growing a layer of thermal oxide layer with a thickness of about 1-2 μm grow on the inner surface of the hemispherical pit, and etching the central position (anchor position) of the thermal oxide layer to form a hole which is preferably a round hole by using lithography and etching on bottom of the pit, then depositing a layer of LPCVD polysilicon layer on the outside of the thermal oxide layer and the side wall and the bottom surface of the hole, i.e. the hemispherical shell layer, the hole cuts though the thermal oxide layer and extends to the silicon wafer, thus the polysilicon layer is connected to the silicon wafer though the round hole and depositing hemispherical shell layer on outer surface of the thermal oxide layer, wherein the hemispherical shell layer is an in-situ doped polysilicon layer, a silicon oxide layer, a silicon nitride layer, or a diamond film;

(3) removing the thermal oxide layer and the hemispherical shell layer outside the inner surface of the hemispherical pit;

(4) etching to form silicon hemispherical electrodes arranged around the hemispherical shell layer on the other side of the silicon wafer by deep reactive ion etching (DRIE), wherein the thermal oxide layer being used as an etching stop layer, and removing the thermal oxide layer after DRIE, the hemispherical shell formed by the hemispherical shell layer being hung at an anchor point, and the hemispherical shell and the several silicon spherical electrodes surrounding the hemispherical shell constitute several capacitors;

(5) depositing and patterning a metal layer on the surface of the silicon wafer to complete metallization, finally forming the resonant layer by the process.

In some embodiments, in the step (4), etching the deep grooves on the silicon wafer by means of photolithography and DRIE to form the silicon hemispherical electrodes, wherein a V-shaped groove photolithography board is utilized during etching, and the width of the deep grooves is proportional to the thickness of the silicon wafer.

In some embodiments, in step (1), the hemispherical pit is etched using by isotropic etching, and the isotropic etching includes dry etching and wet etching.

In some embodiments, in step (3), the thermal oxide layer and the polysilicon layer is removed by mechanical polishing.

In some embodiments, in the step (4), the thermal oxide layer is etched by gaseous hydrofluoric acid.

In some embodiments, the thickness of the thermal oxide layer is 1-2 μm.

In some embodiments, in the step (3), after the thermal oxide layer and the hemispherical shell layer are removed, the first capping layer is bound to the side close to the hemispherical shell of the silicon wafer.

In some embodiments, in the step (5), the second capping layer is bound to the side close to the silicon hemispherical electrodes of the silicon wafer; the bonding method comprises opening a shallow grooves on the surface of the second capping layer which is bound to the resonant layer using anodic silicon oxide-glass bonding method when the second capping layer is made of glass material, and depositing a getter film layer in the shallow grooves, then performing the bonding; or utilizing silicon-silicon direct bonding method when the second capping layer is made of silicon material.

Due to the technical solution mentioned above, the present invention has following advantages compared with prior art:

The sensitivity of the silicon hemispherical resonance micromechanical gyroscope of the present invention doesn't depend on its amplitude, and it has a lower driving voltage, therefore its output noise could be significantly reduced, and its accuracy could be raised than the gyroscope products in the prior art;

The hemispherical resonance micromechanical gyroscope of the present invention utilizes processing method on the basis of silicon micromachining, which leads to small size and low production cost, as well as batch production capacity.

1 resonant layer; 2 hemispherical shell; 2a anchor point; 20 polysilicon layer; 3 deep grooves; 4 driving electrodes; 5 equilibrium (or forcer) electrodes; 6 signal detection electrodes; 7 shielded electrodes; 8 thermal oxide layer; 9 first capping layer; 10 hemispherical pit; 10a hole; 11 second capping layer; 12 shallow grooves; 13 getter film layer; 14 quadrature correction electrodes.

DESCRIPTION OF THE EMBODIMENTS

Now, embodiments of the present invention will be described in detail by reference to the accompanying drawings.

Figure 1:
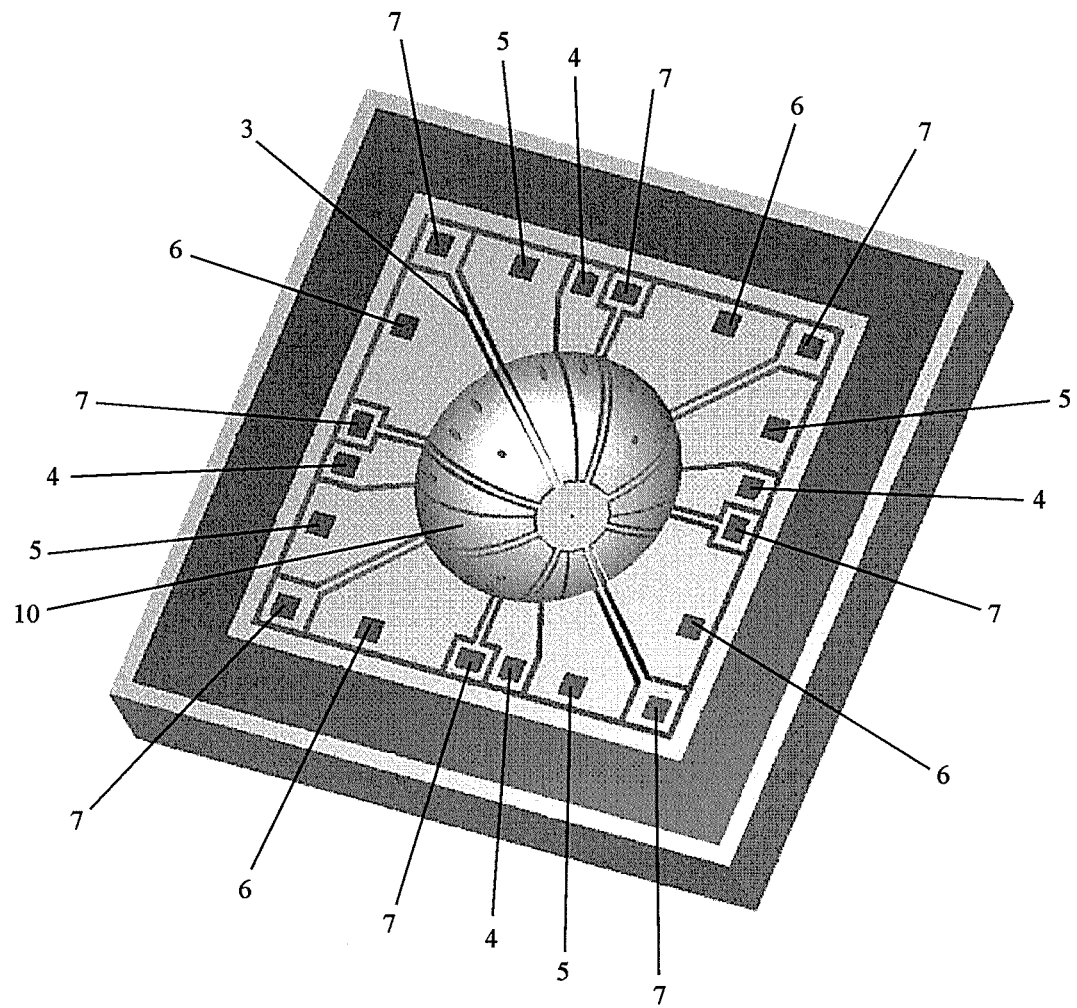
FIG. 1 is a distribution diagram of the silicon hemispherical electrodes of the hemispherical resonance micromechanical gyroscope of the present invention.
Figure 2:
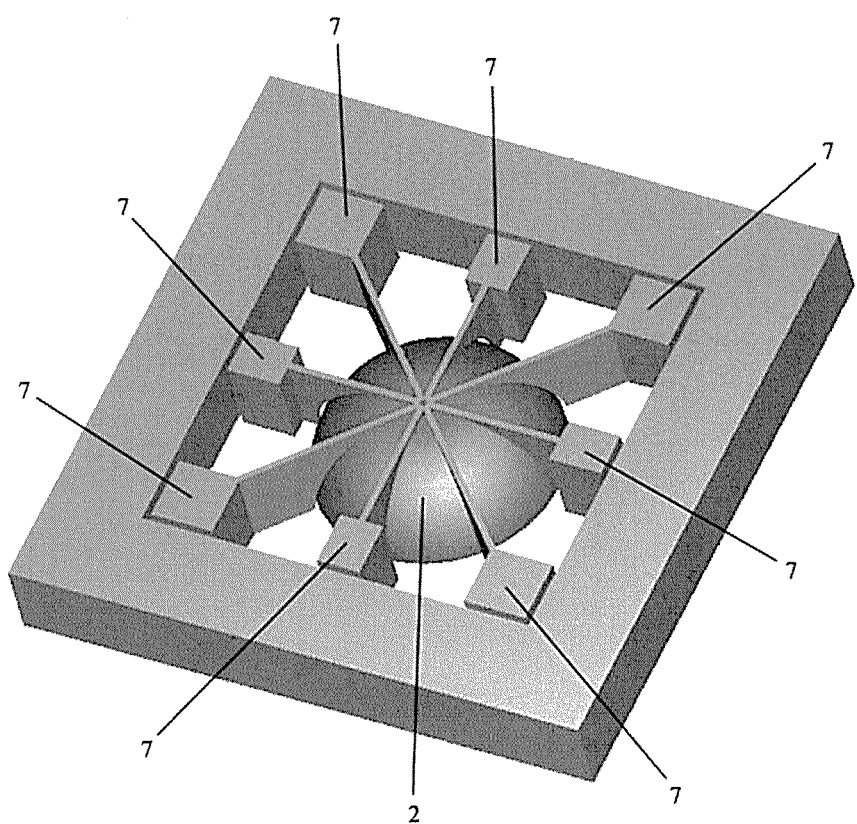
FIG. 2 is a diagram illustrating the shielded electrodes supporting the hemispherical shell of the hemispherical resonance micromechanical gyroscope of the present invention.

A hemispherical resonance micromechanical gyroscope, which comprises a resonant layer 1, a first capping layer 9 and a second capping layer being bound on both sides of the resonant layer 1, as shown in FIG. 1 and FIG. 2.

The resonant layer 1 comprises a hemispherical shell 2 and several silicon spherical electrodes arranged around the hemispherical shell 2. The hemispherical shell 2 could be made of in-situ doped polysilicon, silicon oxide, silicon nitride or diamond. In the present embodiment, it's made of polysilicon. The hemispherical shell 2 has a concave inner surface and an outer surface opposite to the inner surface, and top point of the hemispherical shell being its anchor point. The silicon spherical electrodes are formed by etching several deep grooves 3 on a silicon wafer and made of a high-doped monocrystalline silicon material. The number of the silicon spherical electrodes is 20 or 24, including driving electrodes 4, equilibrium electrodes (or forcer) 5, signal detection electrodes 6 and shielded electrodes 7. In the present embodiment, there are eight shielded electrodes 7 which are symmetrically distributed along the circumferential direction of the hemispherical shell 2, and the shielded electrodes 7 separate the driving electrodes 4 and the equilibrium electrodes 5 from the signal detection electrodes 6. Therefore, coupling coefficient of the driving electrodes 4 and the signal detection electrodes 6 is reduced, resulting in a reduction of quadrature error and noise. The shielded electrodes 7 converge at a point and the converging point is an anchor point of the hemispherical shell 2, so that the shielded electrodes 7 could serve to support the hemispherical shell 2. The mechanical support and electrical connection of the shielded electrodes 7 and the hemispherical shell 2 are accomplished through the anchor point. The hemispherical shell 2 and several silicon spherical electrodes surrounding the hemispherical shell 2 constitute several capacitors. The radius of the hemispherical shell 2 is 1200-1800 μm, which is typically 1300 μm; and the thickness of the hemispherical shell 2 is 0.5-2.5 μm, which is typically 2.0 μm.

The first capping layer 9 is a glass plate or a silicon plate with silicon oxide, and the second capping layer 11 is made of glass material containing through-holes or silicon material containing through-holes, the glass material containing through-holes or silicon material containing through-holes guides the silicon hemispherical electrodes to the surface of the hemispherical resonance micromechanical gyroscope.

Figure 3:
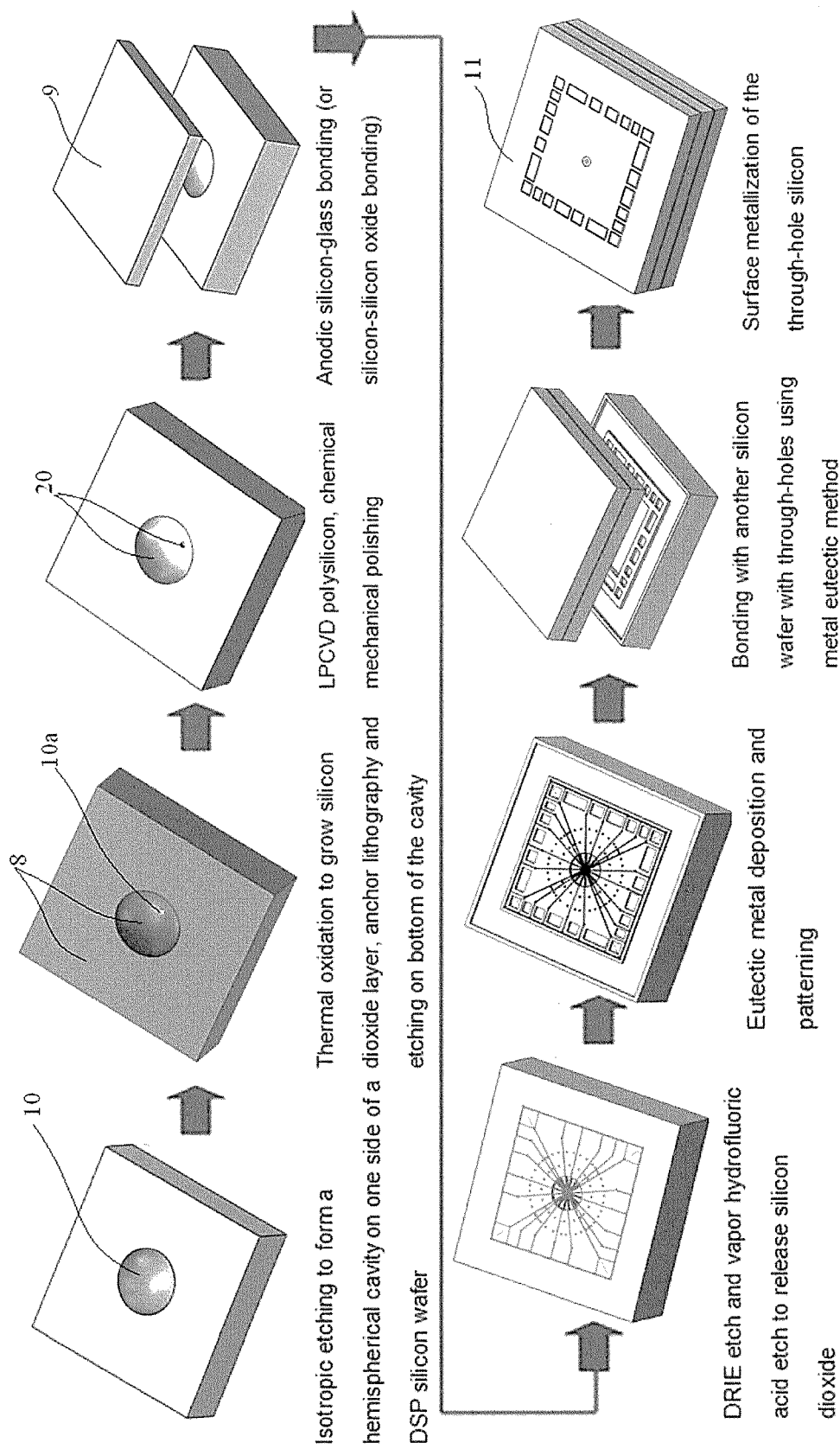
FIG. 3 is a flow chart illustrating processing method of the hemispherical resonance micromechanical gyroscope of the present invention.

As shown in FIG. 3, the hemispherical resonance micromechanical gyroscope mentioned above utilizes a processing method on the basis of silicon micromachining. The processing method includes following steps.

(1) A hemispherical pit 10 with a radius of 1200-1800 μm on the (111) surface of the silicon wafer is etched by isotropic etching (including dry etching and wet etching), and the etched surface is as smooth as a mirror.

(2) A layer of thermal oxide layer 8 with a thickness of about 1-2 μm is grown on the inner surface of the hemispherical pit 10, and the central position (anchor position) of the thermal oxide layer 8 is etched to form a hole 10a which is preferably a round hole by using lithography and etching on bottom of the pit 10. A layer of LPCVD in-situ doped polysilicon layer 20 is deposited on the outside of the thermal oxide layer 8 and the side wall and the bottom surface of the hole 10a, i.e. the hemispherical shell layer. The hole 10a cuts though the thermal oxide layer 8 and is communicated with the silicon wafer, thus the polysilicon layer 20 is connected to the silicon wafer though the round hole 10a, and the polysilicon depositing in the round hole 10a forms the anchor point.

(3) The thermal oxide layer 8 and the polysilicon layer outside the inner surface of the hemispherical pit 10 is removed by mechanical polishing. Therefore, the thermal oxide layer 8 and the polysilicon layer are only retained on the inner surface of the hemispherical pit 10. A silicon-glass bonding to one side of the silicon wafer close to the polysilicon layer with a glass plate is made by using anodic oxidation method, or is directly bound with a silicon plate grown with a silicon oxide layer, i.e. bound with the first capping layer 9.

Figure 4:
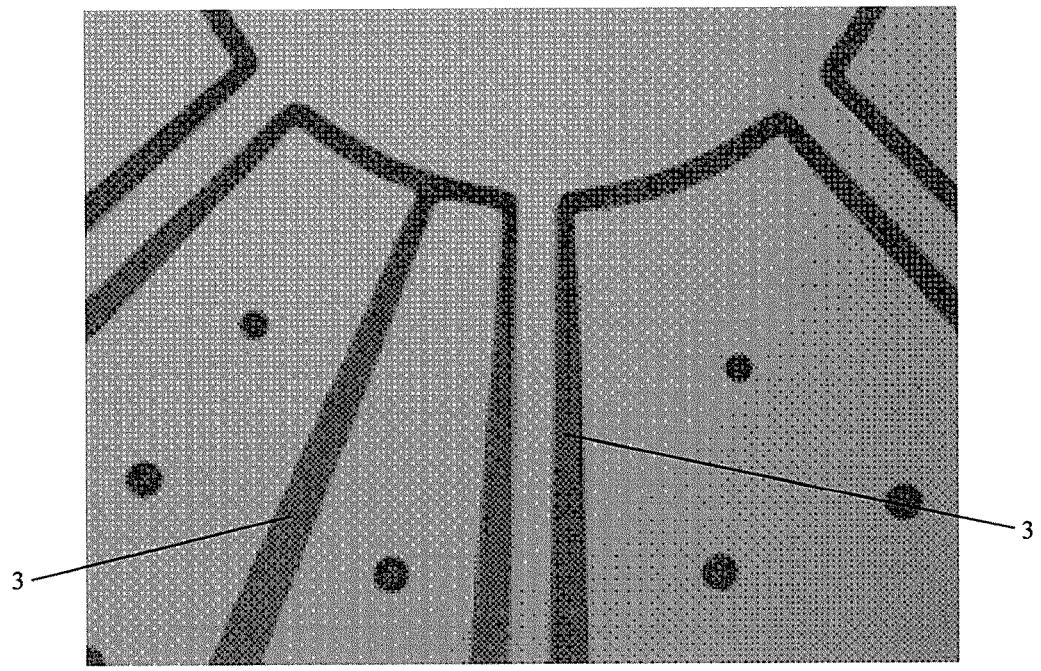
FIG. 4 is a window diagram illustrating the silicon hemispherical electrodes being formed by deep grooves etching of the hemispherical resonance micromechanical gyroscope of the present invention.
Figure 5:
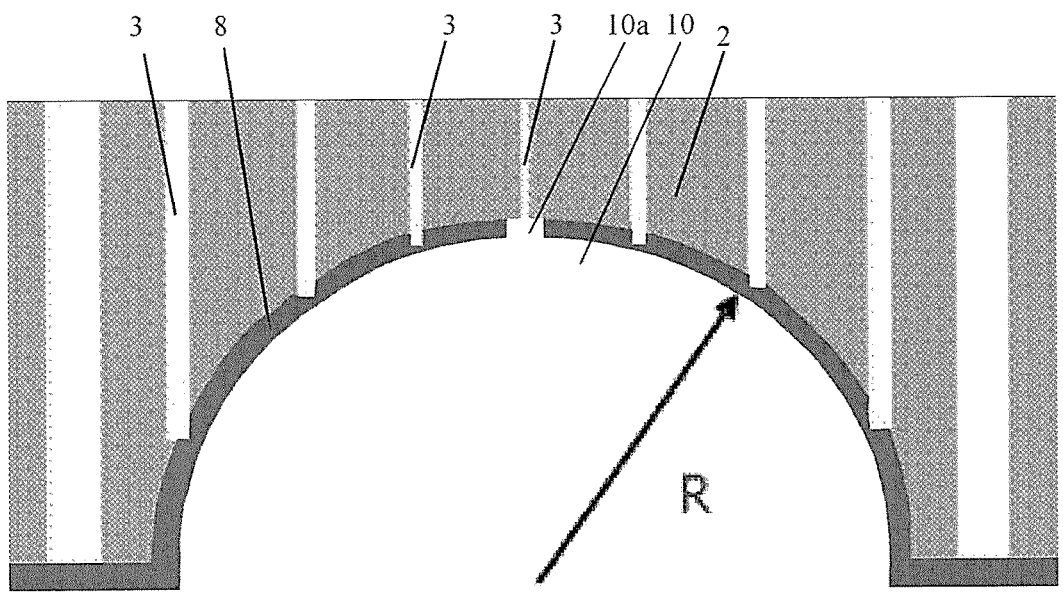
FIG. 5 is a cross-sectional diagram of the silicon wafer of the hemispherical resonance micromechanical gyroscope of the present invention, wherein the hemispherical shell is not shown.

(4) Etching deep grooves 3 on the other side of the silicon wafer by lithography and DRIE dry etch to form the silicon hemispherical electrodes surrounding the hemispherical shell 2, and sacrifice the thermal oxide layer to form the resonant layer 1. The thermal oxide layer 8 is used as an etching stop layer. As shown in FIG. 4 and FIG. 5, a V-shaped groove lithography board is utilized during etch, and the width of the deep grooves 3 is proportional to the thickness of the silicon wafer. As the section thickness of the silicon wafer is uneven due to existence of the hemispherical pit 10, the thermal oxide layer 8 growing thereof is also spherical. During etching of the deep grooves 3 from top to bottom (wherein "top" and "bottom" means the top and bottom direction shown in FIG. 4), the etch rate is proportional to a window width of the deep grooves 3, and when the thinner positions of the silicon wafer has been penetrated, the etching to the thicker positions of the silicon wafer has not been finished. In order to prevent this phenomenon, the V-shaped groove lithography board mentioned above is utilized, which makes the window width of the deep grooves 3 close to the anchor point relatively narrow, and the window width of the deep grooves 3 close to the edge of the hemispherical shell 2 relatively wide. Therefore, the deep grooves 3 appearing on the silicon wafer are V-shape in the direction from the anchor point to the edge of the hemispherical shell 2. During etching, the etch rate of the positions close to the anchor point is relatively low, and the etch rate of the positions close to the edge of the hemispherical shell 2 is relatively high, which makes sure that time of etching to the barrier layer is nearly identical in order to avoid the phenomenon that some regions have been penetrated before the etching being finished. After etching of the silicon spherical electrodes, release the thermal oxide layer 8 using gaseous hydrofluoric acid (vapor HF), so that the hemispherical shell layer forms the hemispherical shell 2 being hung at the anchor point, and the hemispherical shell 2 and the several silicon hemispherical electrodes which surround the hemispherical shell form several capacitors. Traditional quartz hemispherical gyroscope utilizes the metal coating method, which leads to small transverse cross section and low signal coupling coefficient between electrodes. the electrodes of the hemispherical resonance micromechanical gyroscope of the present invention utilize high-doped monocrystalline spherical electrodes with large transverse cross section and high coupling coefficient between electrodes, which easily cause noise interference. By adding the shielded electrodes 7, it could serve to support the hemispherical shell 2 and minimize the noise interference.

Figure 6:
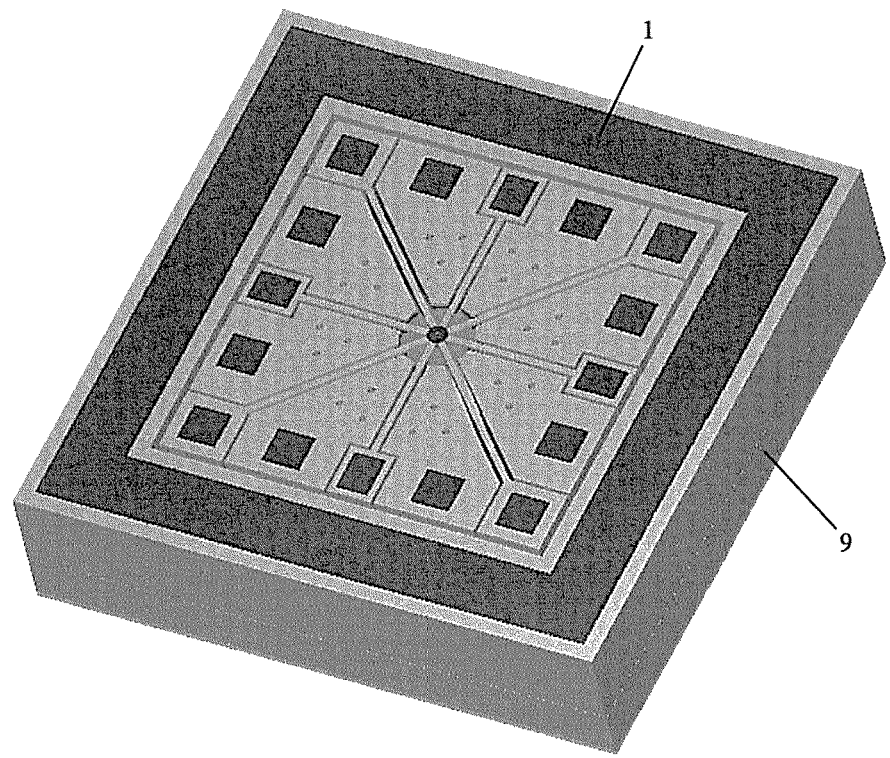
FIG. 6 is a diagram of the hemispherical resonance micromechanical gyroscope of the present invention before the second capping layer being bound to it.
Figure 7:
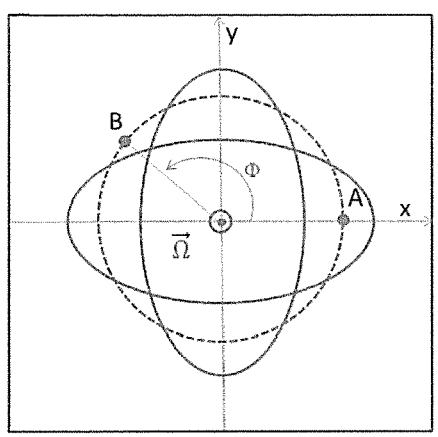
FIG. 7 is a working principle diagram of the hemispherical resonance micromechanical gyroscope of the present invention.
Figure 7:
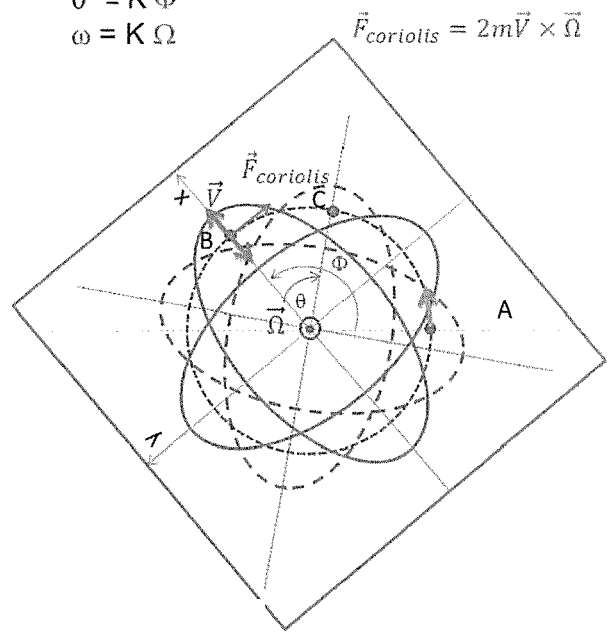
Figure 8:
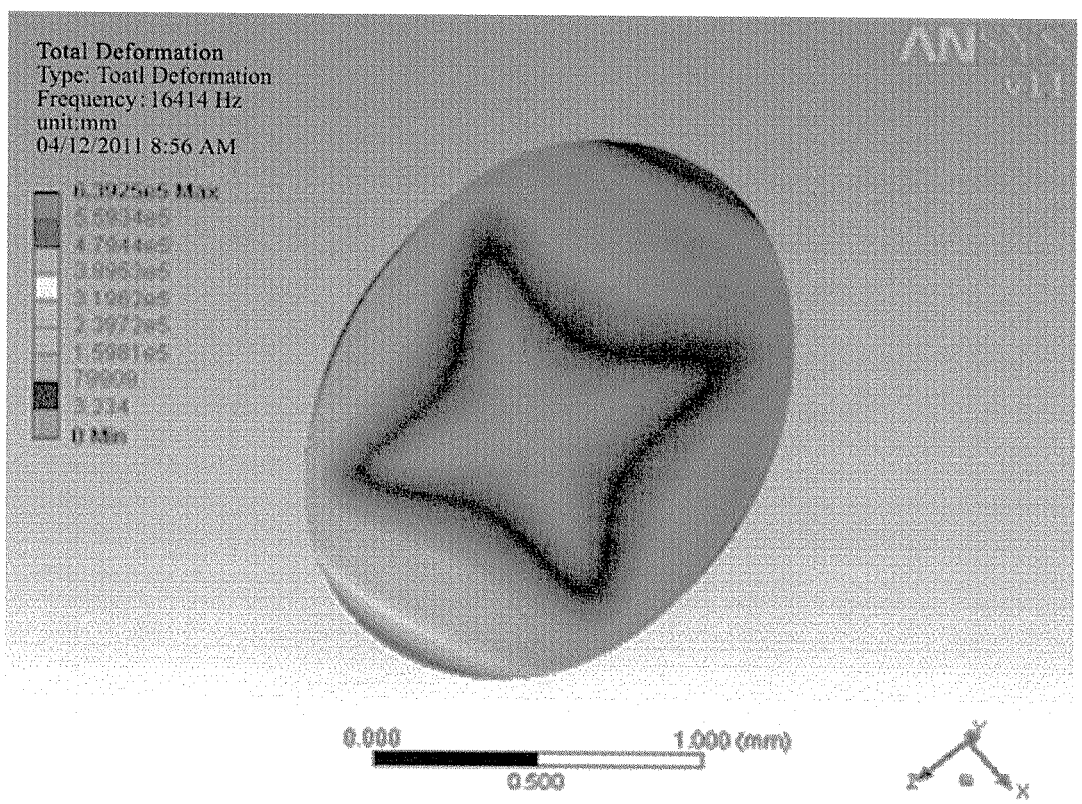
FIG. 8 is a four antinodes mode analysis diagram of the hemispherical resonance micromechanical gyroscope of the present invention.
Figure 9:
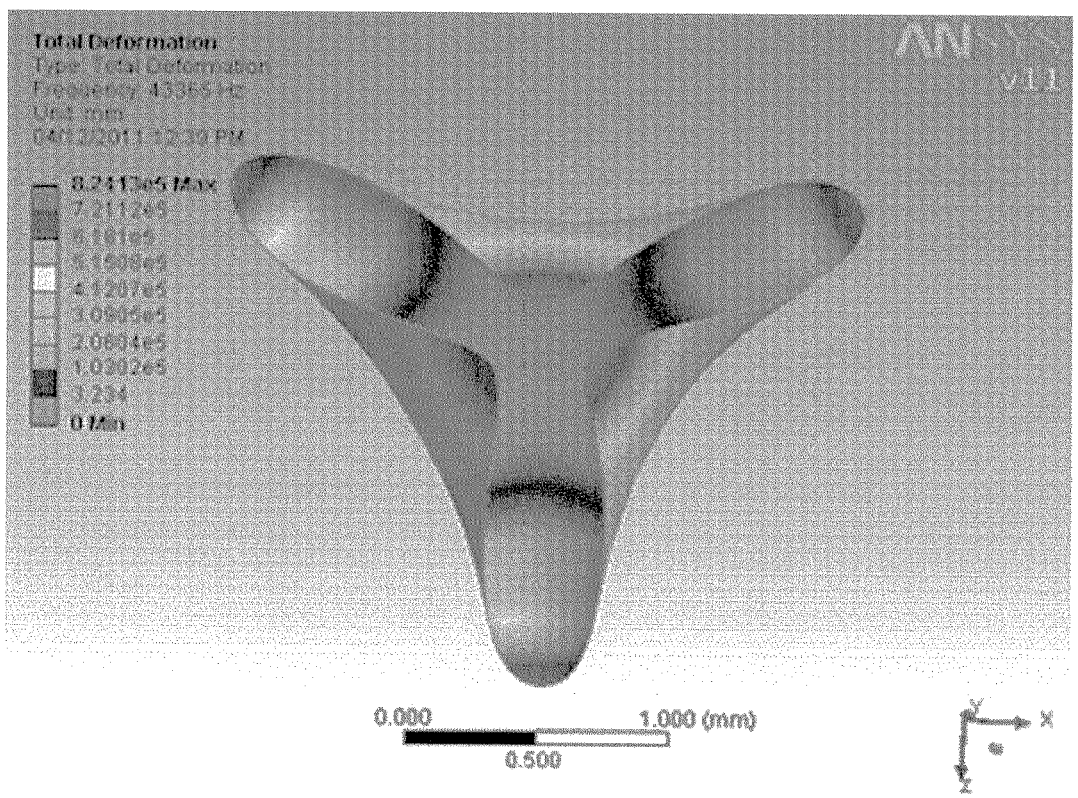
FIG. 9 is a three antinodes mode analysis diagram of the hemispherical resonance micromechanical gyroscope of the present invention.
Figure 10:
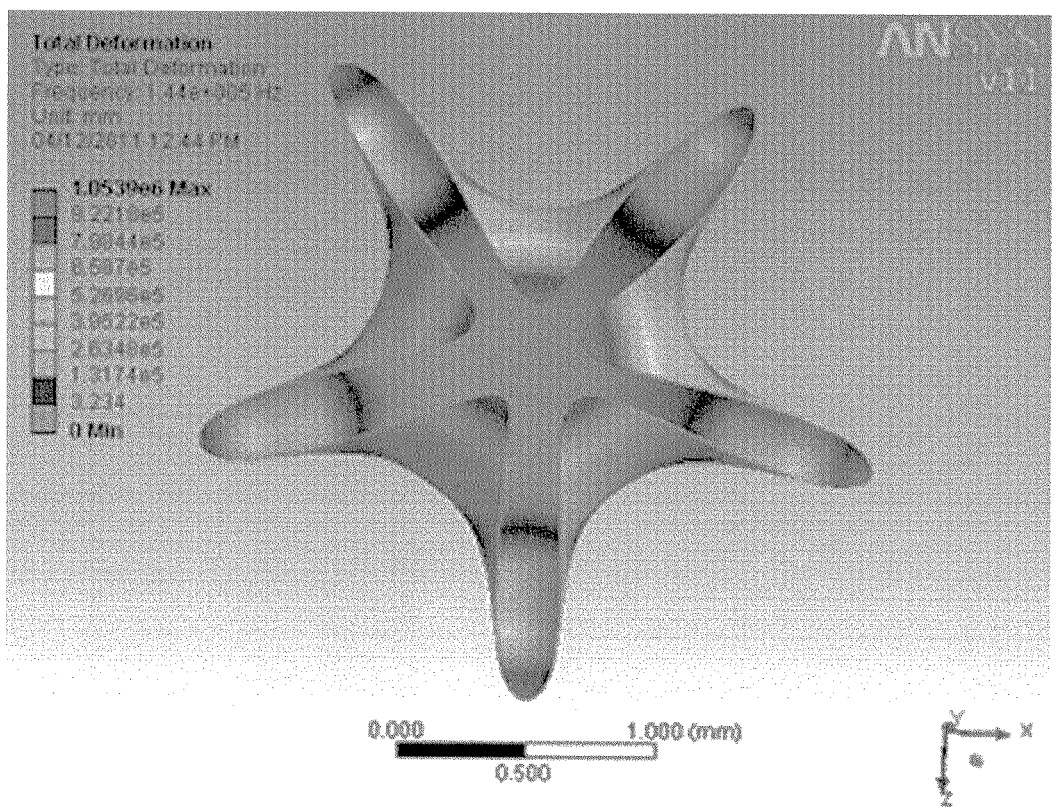
FIG. 10 is a five antinodes mode analysis diagram of the hemispherical resonance micromechanical gyroscope of the present invention.
Figure 11:
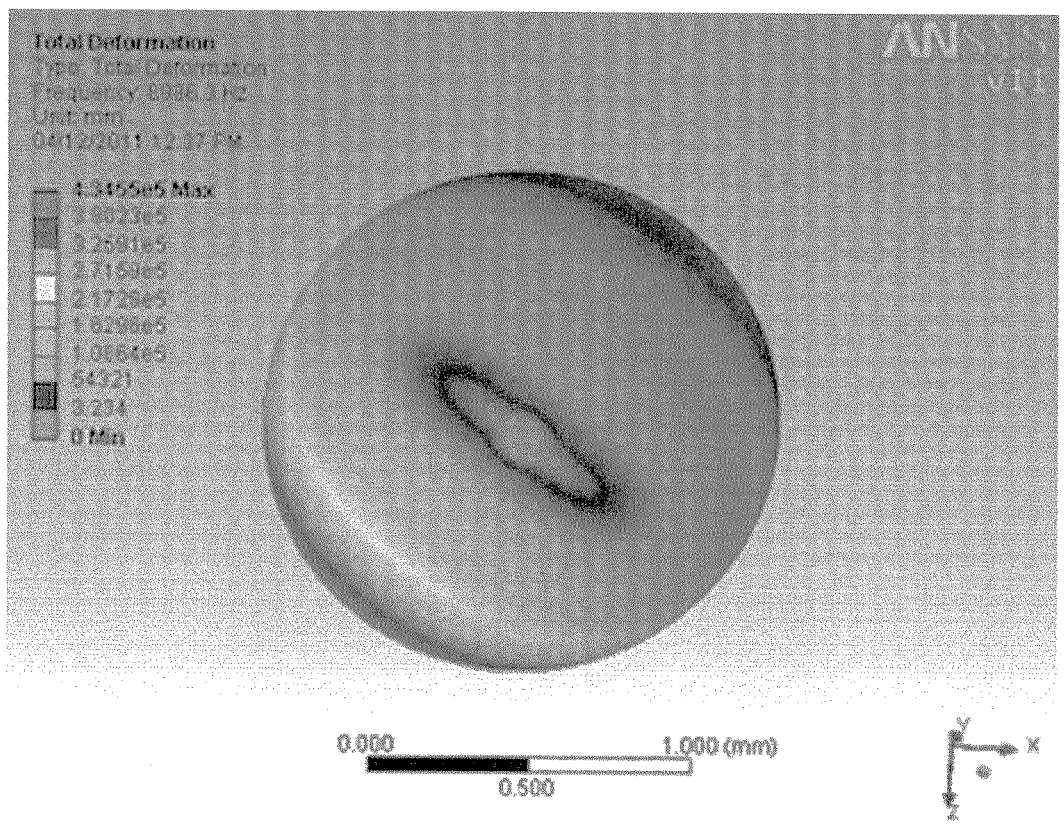
FIG. 11 is a pendulum resonance mode analysis diagram of the hemispherical resonance micromechanical gyroscope of the present invention.
Figure 12:
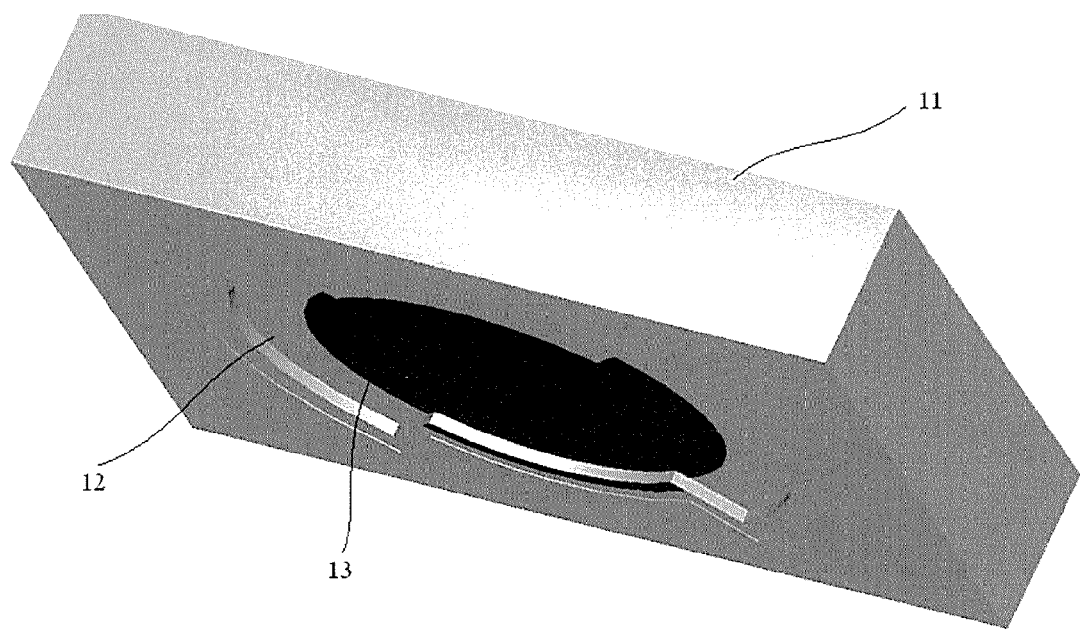
FIG. 12 is a perspective view of the second capping layer illustrating shallow grooves with a deposited getter film layer of the hemispherical resonance micromechanical gyroscope of the present invention.

(5) depositing metal on the surface of the silicon wafer which is released after the sacrifice of the thermal oxide layer and make lithography to complete metallization, finally forming the resonant layer 1 by the process, as shown in FIG. 6. A second capping layer 11 is vacuum bound on the side of the resonant layer 1 close to the silicon spherical electrodes, so that the hemispherical shell 2 is absolutely closed in vacuum. The second capping layer 11 is made of glass material containing through-holes or silicon material containing through-holes, glass material containing through-holes or silicon material containing through-holes guides the silicon spherical electrodes to the surface of the gyroscope. If the second capping layer 11 is made of glass material, the anodic silicon oxide-glass bonding method is utilized. In order to enhance the Q value as much as possible, open shallow grooves 12 on the surface of the second capping layer 11 which is bound to the resonant layer 1, and a getter film layer 13 is deposited in the shallow grooves 12, then the bonding is performed. If the second capping layer 11 is made of silicon material, utilize silicon-silicon direct bonding method, which doesn't require depositing a getter film layer 13 because it's a high-temperature bonding with high air tightness. Make lithography drilling on the second capping layer 11 after bonding, then sputtering metal electrodes and slicing are performed to finish the processing.

As shown in FIG. 7-FIG. 11, the operating principle of the present invention is as follows: When the hemispherical shell 2 rotates around the central axis as a harmonic oscillator, the Coriolis effect is generated so that its vibration wave processes relative to the hemispherical shell 2 in the ring direction. When the hemispherical shell 2 turns around its central axis at an angle, the vibration wave turns reversely to the hemispherical shell 2 at the same angle, and, wherein K is called angular-gain factor. As long as the angle which the vibration wave turns relative to the hemispherical shell 2 has been measured, the angle which the hemispherical shell 2 turns around the central axis could be measured, then an angular rate could be obtained by differentiating the rotation angle. So the measure object of the hemispherical resonance gyroscope is actually the phase of the resonant mode, which is different from the silicon micromechanical resonance gyroscope measuring the amplitude as usual. At present most MEMS gyroscope is on the basis of resonance amplitude measurement, and its sensitivity depends on the amplitude. However, the noise signal increases along with the increase of the amplitude, which restricts improvement of the SNR. The sensitivity of the hemispherical resonance gyroscope is independent of amplitude, and its driving voltage could be very low, as a result its output noise could be significantly reduced. Therefore, the accuracy of the silicon MEMS hemispherical resonance gyroscope could be raised one to three orders of magnitude compared with the MEMS comb gyroscope products in the prior art.

The resonance mode of the hemispherical shell 2 could be acquired by finite element analysis. Typical resonance modes have been shown in FIG. 8-FIG. 11, including four antinodes resonance mode, three antinodes resonance mode, five antinodes resonance mode and pendulum resonance mode. The operating resonance mode of the hemispherical shell 2 mentioned above, i.e. the lowest resonance mode is the four antinodes mode, the resonance frequency is 2.0-150 kHz, typically 13-20 kHz. The operating stability of a low resonance mode is usually better than a high order resonance mode.

The silicon hemispherical resonance gyroscope of the present invention is made using isotropic etching process, as well as 3D spherical lithography and bulk silicon production process. The diameter of the hemispherical shell 2 is about 2 mm or less, and the thickness of the hemispherical shell 2 is about 2. Because the silicon hemispherical resonance gyroscope of the present invention utilizes MEMS micromachining method, wafer-level packaging could be achieved, as well as batch production capacity, and the cost could be significantly reduced, meanwhile advantages of the hemispherical gyroscope such as high accuracy could be retained. It's possible that the present invention could bring a revolution to the inertial technology field, and make the navigation system become universal and low price in the future.

Figure 13:
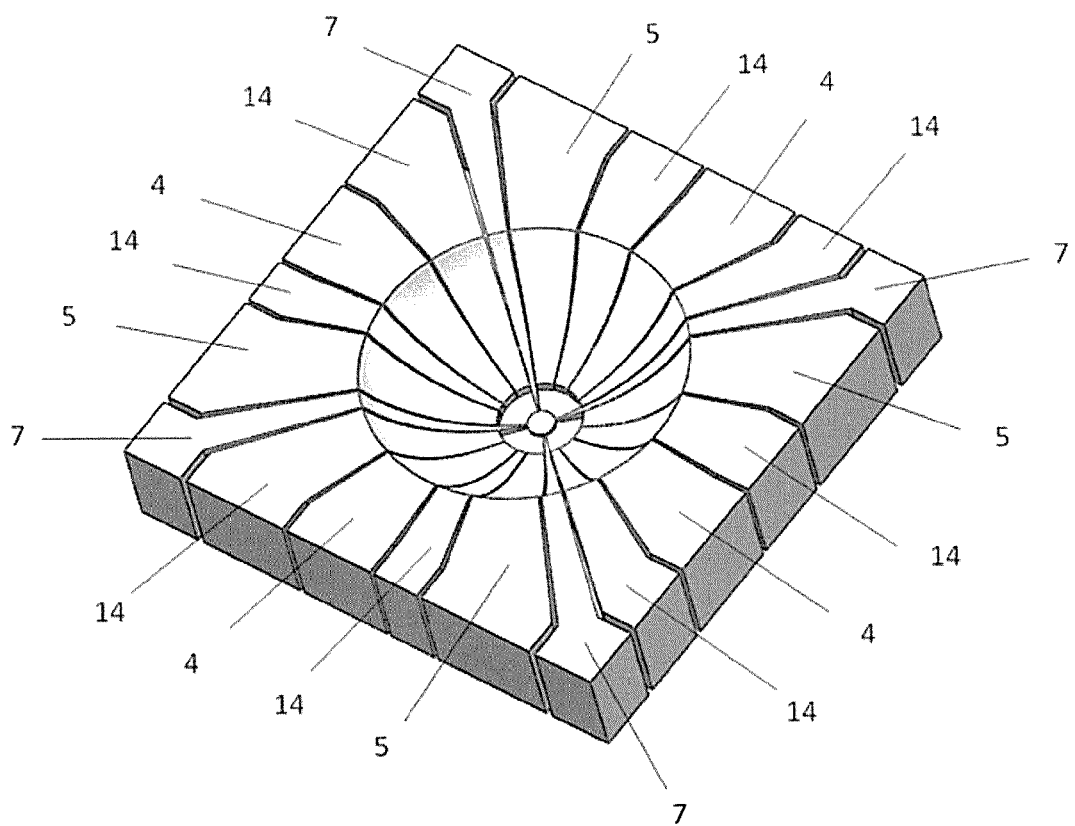
FIG. 13 is a distribution diagram of the silicon hemispherical electrodes of another embodiment of the present invention, wherein the hemispherical shell is not shown.
Figure 14:
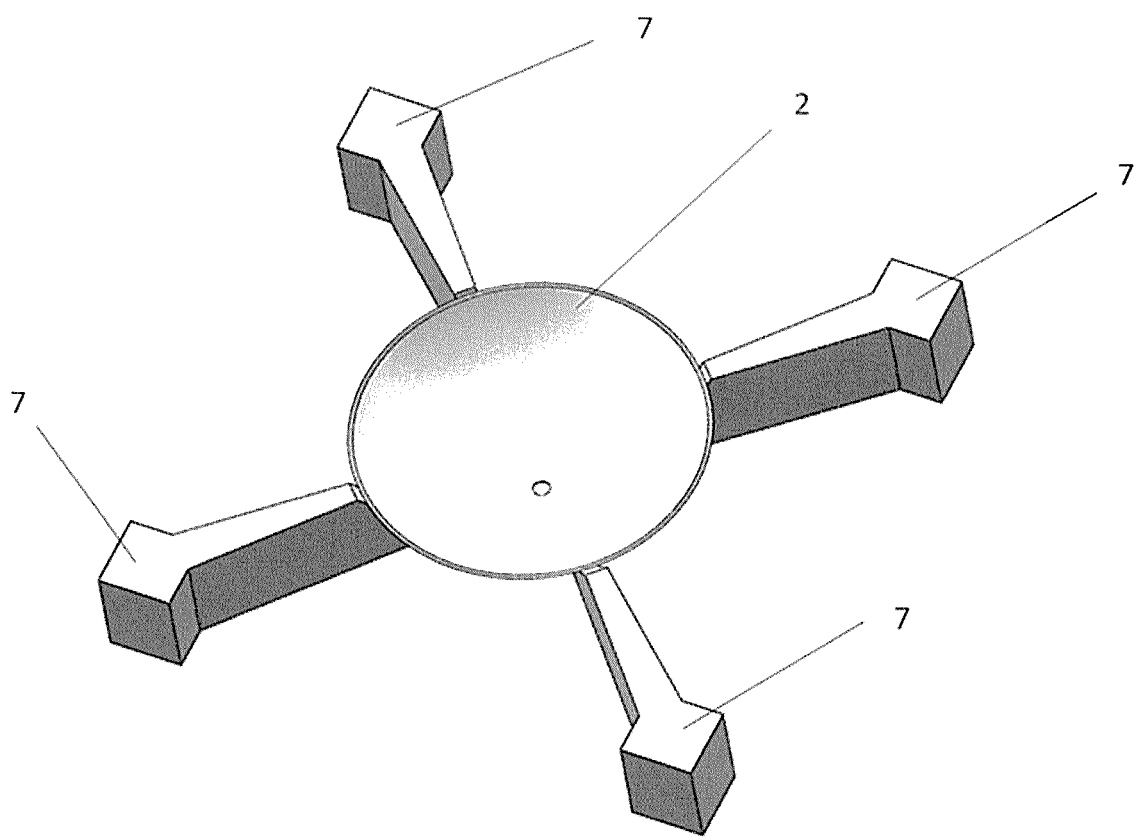
FIG. 14 illustrates the hemispherical shell and the shielded electrodes of another embodiment of the present invention.
Figure 15:
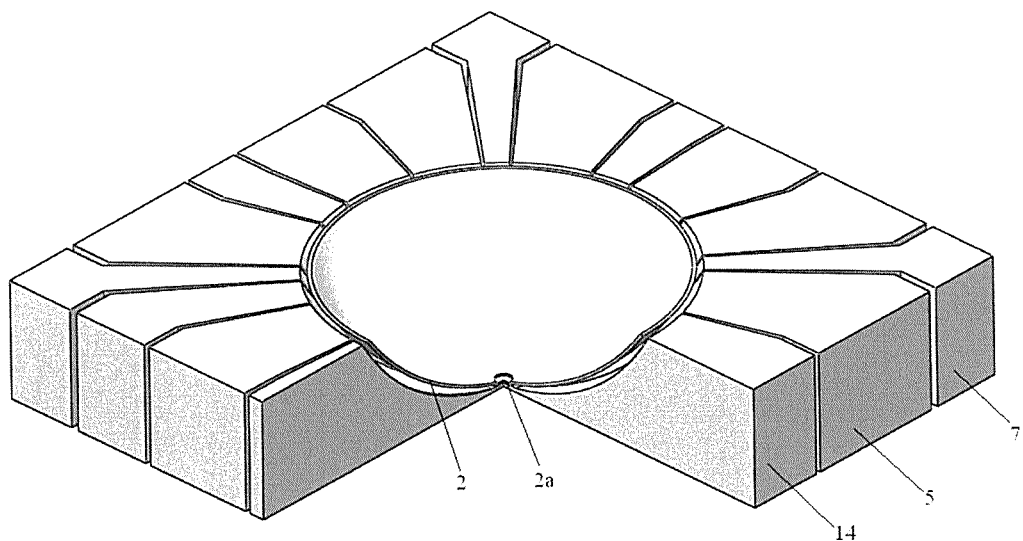
FIG. 15 is a partial sections of the resonant layer of another embodiment of the present invention.

In another embodiment, as shown in FIGS. 13-15, the silicon spherical electrodes including driving electrodes 4, equilibrium electrodes 5, quadrature correction electrodes 14 and shielded electrodes 7. There are four shielded electrodes 7 which are symmetrically distributed along the circumferential direction of the hemispherical shell 2, and quadrature correction electrodes 14 are tuning electrodes for quadrature correction. The shielded electrodes 7 converge at a point and the converging point is the anchor point 2a of the hemispherical shell 2, so that the shielded electrodes 7 could serve to support the hemispherical shell 2. The mechanical connection and electrical connection of the shielded electrodes 7 and the hemispherical shell 2 are accomplished through the anchor point 2a. The hemispherical shell 2 and several silicon spherical electrodes which surround the hemispherical shell 2 constitute several capacitors. The hemispherical shell 2 has a concave inner surface and an outer surface opposite to the inner surface, and top point of the hemispherical shell being its anchor point 2a. The radius of the hemispherical shell 2 is 600-5000 µm, which is typically 1200-1800 µm; and the thickness of the hemispherical shell 2 is 0.5-10 µm, which is typically 2.0-5 µm.

The object of the embodiments mentioned above is only to illustrate technical ideas and characteristics of the present invention, therefore those skilled in the art could understand contents of the present invention and implement the invention, but not to limit the scope of the present invention. All the equivalent alternations or modifications according to the spirit substance of the present invention should be covered by the scope of the present invention.

What is claimed is:

1. A hemispherical resonance micromechanical gyroscope, comprising a resonant layer, wherein the resonant layer comprises:
   a silicon wafer;
   a hemispherical shell being made of in-situ doped polysilicon, silicon oxide, silicon nitride, or diamond; and
   several silicon concave electrodes being arranged around the hemispherical shell, wherein the several silicon concave electrodes include driving electrodes, shielded electrodes, equilibrium electrodes, and either signal detection electrodes or quadrature correction electrodes,
   wherein the shielded electrodes converge at a point and the point is an anchor point of the hemispherical shell,
   wherein mechanical support and electrical connection of the shielded electrodes and the hemispherical shell are accomplished through the anchor point,
   wherein the hemispherical shell and the several silicon concave electrodes which surround the hemispherical shell constitute several capacitors,
   wherein the several silicon concave electrodes are formed by etching grooves on the silicon wafer by means of lithography and DRIE dry etching with a V-shaped groove lithography board being utilized during etching to make the width of the grooves proportional to the thickness of the silicon wafer, such that the width of the grooves close to the anchor point is relatively narrow, and the width of the grooves close to the edge of the hemispherical shell is relatively wide.

2. The hemispherical resonance micromechanical gyroscope of claim 1, wherein the number of the several silicon concave electrodes is 20 or 24, including 4 or 8 shielded electrodes therein, and the shielded electrodes are symmetrically distributed along the circumferential direction of the hemispherical shell.

3. The hemispherical resonance micromechanical gyroscope of claim 2, wherein the several silicon concave electrodes include 8 shielded electrodes, and the shielded electrodes separating the driving electrodes and the equilibrium electrodes from the signal detection electrodes.

4. The hemispherical resonance micromechanical gyroscope of claim 1, wherein the radius of the hemispherical shell is 600-5000 μm.

5. The hemispherical resonance micromechanical gyroscope of claim 1, wherein the thickness of the hemispherical shell is 0.5-10 μm.

6. The hemispherical resonance micromechanical gyroscope of claim 1, wherein an operating resonance mode of the hemispherical shell has at least four antinodes, and the resonant frequency of the hemispherical shell is 2.0-150 kHz.

7. The hemispherical resonance micromechanical gyroscope of claim 1, wherein one side of the resonant layer which is close to the hemispherical shell is bound with a first capping layer, and the other side of the resonant layer which is close to the silicon concave electrodes is bound with a second capping layer;

wherein the first capping layer is a glass plate or a silicon plate grown with a silicon oxide layer, and the second capping layer is made of glass material containing through-holes or silicon material containing through-holes, the glass material containing through-holes or silicon material containing through-holes allowing access to the several silicon concave electrodes.

8. A method for producing the hemispherical resonance micromechanical gyroscope of claim 1, comprising the following steps:

(1) isotropically etching a hemispherical pit on one side of the silicon wafer;

(2) growing a silicon dioxide layer on the inner surface of the hemispherical pit by thermal oxidation in order to form a thermal oxide layer, and forming a hole on the central position of the thermal oxide layer which goes through the thermal oxide layer, then depositing a hemispherical shell layer on the outside of the thermal oxide layer and the bottom surface of the hole, wherein the hemispherical shell layer is an in-situ doped polysilicon layer, a silicon oxide layer, a silicon nitride layer, or a diamond film, the hemispherical shell is connected to the silicon wafer through the hole, and the polysilicon layer, silicon oxide layer, silicon nitride layer, or diamond film deposited in the hole forms the anchor point;

(3) removing the thermal oxide layer and the hemispherical shell layer outside the inner surface of the hemispherical pit by using a mechanical polishing method;

(4) etching grooves on the silicon wafer by means of lithography and DRIE dry etching on another side of the silicon wafer to form the several silicon concave electrodes arranged around the hemispherical shell layer by utilizing the V-shaped groove lithography board during etching to make the width of the grooves proportional to the thickness of the silicon wafer, wherein the thermal oxide layer is used as an etching stop layer;

etching the thermal oxide layer; and forming the hemispherical shell from the hemispherical shell layer hung at the anchor point, wherein the hemispherical shell and the several silicon concave electrodes which surround the hemispherical shell constitute the several capacitors; and (5) depositing metal on the surface of the silicon wafer, and performing lithography for completing the resonant layer.

9. The method for producing the hemispherical resonance micromechanical gyroscope of claim 8, wherein the hemispherical pit is etched by using an isotropic etching method including a dry etching method and a wet etching method.

10. The method for producing the hemispherical resonance micromechanical gyroscope of claim 8, wherein, in step (4), the thermal oxide layer is etched using gaseous hydrofluoric acid.

11. The method for producing the hemispherical resonance micromechanical gyroscope of claim 8, wherein the thickness of the thermal oxide layer is 1-2 μm.

12. The method for producing the hemispherical resonance micromechanical gyroscope of claim 8, wherein after the thermal oxide layer and the hemispherical shell layer outside the inner surface of the hemispherical pit are removed in step (3), the process further comprises a bonding step to bond a first capping layer to the one side close to the hemispherical shell of the silicon wafer.

13. The method for producing the hemispherical resonance micromechanical gyroscope of claim 8, further comprising a step of bonding a second capping layer to the other side close to the silicon concave electrodes of the silicon wafer, wherein the second capping layer is made of glass material, the step of bonding the second capping layer comprises:

opening other grooves on the surface of the second capping layer;

depositing a getter film layer in the other grooves; and bonding the second capping layer, via an anodic silicon oxide-glass bonding method, to the other side close to the silicon spherical electrodes of the silicon wafer.

14. The method for producing the hemispherical resonance micromechanical gyroscope of claim 8, further comprising a step of bonding a second capping layer to the another side close to the silicon concave electrodes of the silicon wafer using a silicon-silicon direct bonding method, wherein the second capping layer is made of silicon material.

* * * * *